(12) United States Patent
Ermer

(10) Patent No.: US 6,623,665 B1
(45) Date of Patent: Sep. 23, 2003

(54) SECOND-ORDER NONLINEAR OPTICS MATERIAL, THE DEVICES USING SAME AND METHODS OF PREPARING

(75) Inventor: Susan P. Ermer, Redwood City, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/507,943

(22) Filed: Feb. 22, 2000

(51) Int. Cl.$^7$ ............................................... G02F 1/361

(52) U.S. Cl. ...................... 252/582; 252/583; 385/2; 385/8; 385/122; 359/328; 560/1; 564/336; 558/303; 562/518; 568/308; 568/309

(58) Field of Search ................................. 252/582, 583; 385/122, 2, 8; 359/328; 560/1; 564/336; 558/303; 562/518; 568/308, 309

(56) References Cited

U.S. PATENT DOCUMENTS

| | | | |
|---|---|---|---|
| 4,859,876 A | * | 8/1989 | Dirk et al. ................. 307/425 |
| 5,414,791 A | | 5/1995 | Ermer et al. |
| 5,561,733 A | | 10/1996 | Ermer et al. |
| 5,708,178 A | | 1/1998 | Ermer et al. |
| 5,718,845 A | | 2/1998 | Drost et al. |
| 5,776,374 A | | 7/1998 | Newsham et al. |
| 5,783,306 A | | 7/1998 | Therien et al. |
| 5,804,101 A | | 9/1998 | Marder et al. |
| 5,811,507 A | | 9/1998 | Chan et al. |
| 5,834,575 A | | 11/1998 | Honda et al. |
| 5,872,882 A | * | 2/1999 | Woudenberg et al. ...... 385/122 |

FOREIGN PATENT DOCUMENTS

EP 93120340.0 12/1993 ............. G02F/1/35

OTHER PUBLICATIONS

"Synthesis, Structure, and Spectra of Merocyanines Prepared from Anionic Polymethine Dyes," S.V. Popov, Yu.L. Slominsky, M.L. Dekhtyar & A.B. Rozhenko, *Dyes and Pigments*, vol. 18, pp. 151–162, Elsevier Science Publishers Ltd, Great Britain (1992).

"Aminoethinylierung, V—Umsetzung stannylierter Inamine mit (Chlormethylen)–malonsäurederivaten," Gerhard Himbert und Wolfgang Brunn [Aminoethinylation, V—Reaction of Stannylated Ynamines with (Chlormethylene)Malonic Acid Derivatives], *Liebigs Annalen der Chemie*, pp. 2206–2216, VCH Verlagsgesellschaft mbH (1985).

* cited by examiner

Primary Examiner—Cephia D. Toomer
(74) Attorney, Agent, or Firm—Townsend and Townsend and Crew LLP (57) ABSTRACT

The present invention relates to nonlinear optical (NLO) materials, compositions thereof and NLO devices using polymeric matrices supporting a second order NLO material defined by the formula

$$ED—B—EW \qquad (I)$$

where ED is an electron donating moiety, B is a bridging moiety, and EW is the electron withdrawing moiety (terminal acceptor group) defined by formula II,

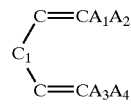

where $C_1$ is a carbon atom linked through a double bond to a cyclic or an acylic carbon atom in the bridging moiety, and $A_1$, $A_2$, $A_3$ or $A_4$ are the same or different from one another, each of which is an electron withdrawing group such as CN, COR, COOR, COOH or CH=$C(R)_2$ where R is a $C_{1-6}$ alkyl.

35 Claims, 2 Drawing Sheets

Photobleaching

Fig. 2B

Poling

Fig. 2C

SECOND-ORDER NONLINEAR OPTICS MATERIAL, THE DEVICES USING SAME AND METHODS OF PREPARING

FIELD OF THE INVENTION

The present invention relates to nonlinear optical (NLO) materials, compositions thereof and NLO devices using those compositions. More specifically, the present invention relates to polymeric matrices supporting a second order NLO material defined by the formula (I)

ED—B—EW                    (I)

where ED is an electron donating moiety, B is an aromatic containing bridging moiety, and EW is an electron withdrawing moiety (terminal acceptor group) defined by formula (II), where $C_1$ is a carbon atom linked through a double bond to a cyclic or an acylic carbon atom in the aromatic containing bridging moiety, and $A_1$, $A_2$, $A_3$ or $A_4$ are the same or different from one another, each of which is an electron withdrawing group such as CN, COR, COOR, COOH or $CH=C(R)_2$ where R is a $C_{1-6}$ alkyl group. In addition $A_1$, $A_2$, $A_3$ or $A_4$ can also be a $C_{1-8}$ alkyl group, $C_{3-7}$ cycloalkyl group, or an aryl group, with the proviso that at least some of $A_1$, $A_2$, $A_3$ or $A_4$ are an electron withdrawing group.

BACKGROUND TO THE INVENTION

Despite advances in the performance of nonlinear optical (NLO) materials, new NLO materials are still needed which provide particular advantages and combinations of properties. Such materials find utility in, for example, optical computing and optical signal processing. Although a variety of both organic and inorganic NLO materials are of interest, organic polymer-based NLO materials have attracted considerable attention. Relatively early NLO polymers are discussed in, for example, *Nonlinear Optical and Electroactive Polymers* (eds. P. Prasad and D. Ulrich; Plenum; 1988) and *Introduction to Nonlinear Optical Effects in Molecules and Polymers* (P. Prasad and D. Williams; John Wiley; 1991). An example of recent work is U.S. Pat. No. 5,414,791 (Ermer et al.) which describes the synthesis and testing of novel compositions for use in thermally-stable electrooptic waveguides incorporated herein by reference.

In particular, NLO compositions are needed which provide higher second order NLO effects. To achieve high second order NLO properties, both microscopic and bulk material considerations can be important. One important measure of the microscopic second order NLO effect is the molecular hyperpolarizability value β (beta). The above-noted text edited by Prasad and Ulrich notes (pg. 8) that:

A conjugated structure with an electron-rich (donor) group on one end and a deficient (acceptor) group on the other end contains the asymmetric charge distribution in the Π system requiredfor large β. In addition to large microscopic beta values, however, large bulk second order nonlinear optical susceptibility $\chi^{(2)}$ is needed. The problem in achieving high $\chi^{(2)}$ is that materials which have large asymmetric charge distributions (i.e., high beta) also tend to have centrosymmetric order which reduces $\chi^{(2)}$. Several approaches have been developed, including "poling," to achieve the non-centrosymmetric order required for high $\chi^{(2)}$. Although a variety of material properties are important in the NLO arts, the general focus of the present invention is developing commercially viable materials with both high beta and $\chi^{(2)}$ values.

Numerous U.S. patents describe NLO materials include, for example, U.S. Pat. Nos. 5,414,791; 5,561,733; 5,718,845; 5,708,178; 5,776,374; 5,783,306; 5,804,101; 5,811,507; and 5,834,575. In addition, second order NLO materials are described by Sun et al. in *Mat. Res. Soc. Symp. Proc.* vol. 413, pp. 263–268 (1996) entitled "Synthesis and Characterization of 1,3-Bis(Dicyanomethylene)indane (BDMI) Derived Second Order NLO Materials."

Despite these and other contributions to the NLO arts, a need remains for novel organic chemical structures to provide properties and combinations of properties not heretofore observed.

SUMMARY OF THE INVENTION

In its broadest sense, the present invention provides novel NLO compositions, device elements and devices which comprise the novel NLO compositions, methods of making and processing the NLO compositions, and methods of using the NLO compositions. Basic and novel characteristics of the present NLO compounds include excellent NLO properties.

One aspect of this invention is providing a compound that has both large microscopic beta values, as well as, large bulk second order nonlinear optical susceptibility $\chi^{(2)}$, where $r_{33}$ values are greater than 25 pm/V.

Another aspect of this invention is providing a device having second order nonlinear optical properties by incorporating a chromophore defined by the formula (I)

ED—B—EW                    (I)

where ED is an electron donating moiety, B is a bridging moiety, and EW is an electron withdrawing moiety (component) which is a terminal acceptor group defined by formula (II)

where $C_1$ is a carbon atom linked through a double bond to a cyclic or an acylic carbon atom in the bridging moiety, and $A_1$, $A_2$, $A_3$ or $A_4$ are the same or different from one another, each of which is an electron withdrawing group such as CN, COR, COOR, COOH or $CH=C(R)_2$ where R is a $C_{1-6}$ alkyl group. In addition $A_1$, $A_2$, $A_3$ or $A_4$ can also be a $C_{1-8}$ alkyl group, $C_{3-7}$ cycloalkyl group, or an aryl group, with the proviso that at least some of $A_1$, $A_2$, $A_3$ or $A_4$ are an electron withdrawing group.

Another object of the present invention is providing a second order NLO material defined by the formula where $R_1$ and $R_2$ can each be a $C_{1-6}$ alkyl group, such as a methyl, ethyl, propyl, iso-propyl, butyl, iso-butyl, pentyl, iso-pentyl, hexyl or iso-hexyl group, or a $C_{1-6}$ alkanol group, such as methanol, ethanol, propanol, butanol, pentanol or hexanol, or a $(-CH_2)_n-CH=CH_2$ group where n=1, 2, 3, 4, 5 or 6. B is aromatic or pseudoaromatic containing bridging moiety defined by formula (V)

(V)

where $R_3$ is an homocyclic or heterocyclic aromatic group having 4 to 7 carbons atoms, wherein the heterocyclic atom is N, O or S, and the homocyclic or heterocyclic aromatic group is unsubstituted or substituted with a $C_{1-6}$ acylic or cyclic alkyl group, such as an arylalkyl, a pyrrole, a furan or thiophene group, or the group $R_3$ can also be cyclohexene substituted with a $C_{1-6}$ alkyl group. In formula II, $A_1$, $A_2$, $A_3$ or $A_4$ are the same or different from one another, each of which is an electron withdrawing group such as CN, COR, COOR, COOH or $CH=C(R)_2$ where R is a $C_{1-6}$ alkyl group. In addition $A_1$, $A_2$, $A_3$ or $A_4$ can also be a $C_{1-8}$ alkyl group, a $C_{3-7}$ cycloalkyl group, or an aryl group, with the proviso that at least some of $A_1$, $A_2$, $A_3$ or $A_4$ must be an electron withdrawing group. Preferably $R_1$ is ethanol, $R_2$ is an ethyl group, and $A_1-A_4$ are each a cyano group.

Another object of the present invention is providing a polymer matrix containing at least one second order NLO material defined by the formula (II)

where $R_1$ and $R_2$ can each be a $C_{1-6}$ alkyl group, such as a methyl, ethyl, propyl, iso-propyl, butyl, iso-butyl, pentyl, iso-pentyl, hexyl or iso-hexyl group, or a $C_{1-6}$ alkanol group, such as methanol, ethanol, propanol, butanol, pentanol or hexanol, or a $(-CH_2)_n-CH=CH_2$ group where n=1, 2, 3, 4, 5 or 6. B is an aromatic or pseudoaromatic bridging defined by formula (V)

(V)

where $R_3$ is an homocyclic or heterocyclic aromatic group having 4 to 7 carbons atoms, wherein the heterocyclic atom is N, O or S, and the homocyclic or heterocyclic aromatic group is unsubstituted or substituted with a $C_{1-6}$ acylic or cyclic alkyl group, such as an arylalkyl, a pyrrole, a furan or thiophene group. The group where $R_3$ can also be cyclohexene substituted with a $C_{1-6}$ alkyl group.

The Groups, $A_1$, $A_2$, $A_3$ or $A_4$ are the same or different from one another, each of which is an electron withdrawing group such as CN, COR, COOR, COOH or $CH=C(R)_2$ where R is a $C_{1-6}$ alkyl group. In addition $A_1$, $A_2$, $A_3$ or $A_4$ can also be a $C_{1-8}$ alkyl group, a $C_{3-7}$ cycloalkyl group, or an aryl group, with the proviso that at least some of $A_1$, $A_2$, $A_3$ or $A_4$ are an electron withdrawing group. Preferably $R_1$ is ethanol, $R_2$ is an ethyl group, and $A_1-A_4$ are each CN.

These and other objects and advantages will become more apparent when considered in conjunction with the following detailed description, drawings and appended claims.

DETAILED DESCRIPTION OF THE INVENTION

The compositions of the present invention can be organic materials which show secondorder NLO responses when suitably processed. The compositions can be incorporated into commercially viable forms such as, for example, thin films and crystals in the same manner as other materials which exhibit NLO properties as disclosed in U.S. Pat. No. 5,414,791. The compositions themselves can be used alone or in combination with other materials which are conventionally used in NLO devices.

In the specification the meanings of terms such as an "electron acceptor moiety"; an "electron withdrawing group"; an "electron donor moiety"; an "electron donating group" can be ascertained by well-known principles of organic chemistry, in general, and of the NLO art, in particular.

In the present invention materials having nonlinear optical properties are provided by compounds defined by formula I above in which the terminal acceptor group is defined by formula (II)

where $C_1$ is a carbon atom linked through a double bond to a cyclic or an acylic carbon atom in the bridging moiety, and $A_1$, $A_2$, $A_3$ or $A_4$ are the same or different from one another, each of which is an electron withdrawing group such as CN, COR, COOR, COOH or $CH=C(R)_2$ where R is a $C_{1-6}$ alkyl group. In addition $A_1$, $A_2$, $A_3$ or $A_4$ can also be a $C_{1-8}$ alkyl group, a $C_{3-7}$ cycloalkyl group, or an aryl group, with the proviso that at least some of $A_1$, $A_2$, $A_3$ or $A_4$ are an electron withdrawing group as defined above. Substituents $A_1-A_4$ are each preferably CN.

Formula (II) above, in conjunction with the double bond linking the aromatic or pseudoaromatic bridging moiety, has multiple carbon-carbon double bonds, and since these double bonds are in conjugation with each other, formula (II) above represents but one resonance structure Each of the four A groups shown in formula (II), $A_1$ to $A_4$, independently of each other can be any monovalent electron withdrawing group. In addition $A_1$, $A_2$, $A_3$ or $A_4$ can also be a $C_{1-8}$ alkyl group, a $C_{3-7}$ cycloalkyl group, or an aryl group, with the proviso that at least some of $A_1$, $A_2$, $A_3$ or $A_4$ are an electron withdrawing group. The molecular weight contribution of each A group is preferably about 250 g/mole or less, more preferably 150 g/mole or less, and for all four A groups together about 1,000 g/mole or less, more preferably 600 g/mole or less. Preferably, each of the four A groups are the same group, and preferably, each is a cyano group.

Planarity of the conjugated system, formula II above where $A_1=A_2=A_3=A_4=CN$.

enhances compounds activity. In addition, sterically some of the groups deviate from planarity which helps keep the dipoles from getting too close and pairing thus ⇌, so they can't be poled to give →

PREPARATION OF THE ACCEPTOR COMPONENT

The preferred second order NLO materials of the present invention are defined by the formula where B is an aromatic or pseudoaromatic bridging moiety, $R_1$ and $R_2$ independently of one another are a $C_{1-6}$ alkyl group, such as methyl, ethyl, propyl, iso-propyl, butyl, iso-butyl, pentyl, iso-pentyl, hexyl, iso-hexyl group, or a $C_{1-6}$ alkanol group, such as methanol, ethanol, propanol, butanol, pentanol or hexanol, and $A_1$, $A_2$, $A_3$ or As are the same or different from one another, each of which is an electron withdrawing group such as CN, COR, COOR, COOH or $CH=C(R)_2$ where R is a $C_{1-6}$ alkyl group. The preferred acceptor molecule is one where the A groups are cyano, and it is prepared according to either of the following methods, or any other protocol known to those of ordinary skill in the art.

In one embodiment malonaldehyde (commercially available in the form of several derivatives, e.g., malonaldehyde bis(diethyl acetal), malonaldehyde bis(dimethyl acetal), malonaldehyde bis(phenylimine) dihydrochioride), malonaldehyde bis(phenylimine) monohydrochloride)) is reacted with malonitrile using standard Knovenagel conditions, in the presence of ethanol solution with catalytic acetic acid, as shown below:

An alternative approach for preparing the terminal EW group defined by formula (II) involves the reaction between bromoacetaldehyde dimethyl acetal and malonitrile(with catalytic p-toluenesulfonic acid in refluxing butanol) to produce 1,1 dicyano-3-bromopropene which is then reacted with 1,1-dicyanoethene in the presence of a palladium catalyst, e.g., $Pd(Ph_3)_4$, shown below:

The acceptor molecule can be attached to the bridging member as follows:

-continued where $R_1$ can be a $C_{1-6}$ alkanol group, such as methanol, ethanol, propanol, butanol, pentanol or hexanol, and preferably an ethanol group, $R_2$ can be a methyl, ethyl, propyl, iso-propyl, butyl, iso-butyl, pentyl, iso-pentyl, hexyl, iso-hexyl group, preferably an ethyl group.

In a preferred embodiment, thiophene forms part of the bridging group, where $R_1$ is ethanol, $R_2$ is an ethyl group and A is a cyano group, shown below:

Another preferred embodiment is shown below:

where $R_1$ and $R_2$ can each be a $C_{1-6}$ alkyl, such as methyl, ethyl, propyl, iso-propyl, butyl, iso-butyl, pentyl, iso-pentyl, hexyl, iso-hexyl, preferably ethyl or a $C_{1-6}$ alkanol group, such as methanol, ethanol, propanol, butanol, pentanol or hexanol and preferably ethanol.

POLYMER MATRIX

Polymer materials suitable use with the NLO compounds in accordance with the present invention are polymers that are optically transparent and chemically resistant to chemical treatments used in photoetching processing steps. Preferred polymers are polycarbonates, obtainable from a variety of polymer suppliers, such as Aldrich (Milwaukie, Wis.), polyurethanes, obtainable from a variety of polymer suppliers, such as Scientific Polymer Products (Ontario, N.Y.), polyquinolines, obtainable from Maxdem (San Dimas, Calif.), benzocyclobutene polymers, such as formed by polymerization of Cyclotene™ obtainable from Dow Chemical (Midland, Mich.), and polybenzoxazoles, obtainable from Daychem (Dayton, Ohio).

In examining the suitability and curing conditions of a given polymer for use in the present invention, it is useful to determine the polymerization and densification properties at desired heat stability conditions, typically above about 200° C. Ideally, the polymer is one which can be cured and partially densified at baking temperatures between 205° C.–350° C., and still provide a $T_g$ in the range less than about 350° C.–375° C. at which molecular dipole orientation can occur in the presence of an applied electric field, or a polymer that can be poled and then crosslinked (densified).

In the alternative, the polymer may be one which becomes highly densified in the temperature range 275° C.–350° C. This polymer may still be suitable if the dipolar molecules have a suitable thermal stability after curing and baking at a high temperature, recognizing that the dipolar molecules will have to be oriented during the high-temperature baking step.

A final consideration in the thermal behavior of the polymer matrix is the ability to maintain its rigid polymer chain condition at elevated temperatures, e.g., in the range above 100° C. or at room temperature for extended periods of time, e.g., >than one year. This is necessary in order to preserve the molecules in their oriented states at elevated temperature. Typically, this will be achieved by carrying out the final densification step and/or molecule poling step at a temperature above the desired thermal stability range, e.g., in the range 125° C.–300° C.

Other polymers suitable for use in the present invention include polyimides, typically supplied as polyamic acid or preimidized material in dried or solution form, such as (polyimide), "ULTRADEL"™ 3112 (polyimide), "ULTRADEL"™ 4212,(polyimide) "ULTRADEL"™ 9000D (polyimide) obtainable from Amoco (Naperville, Ill.), "LQ2200"™(polyimide) obtainable from Hitachi (Japan), "PYRALIN"™ (celluloid; polyimide, glass fibers) obtainable from DuPont (Wilmington, Del.), and "PROBAMIMDE"™ ($C_8H_{18}N_2$) obtainable from OCG.

In formulating a polymer solution, the polymer chains are dissolved in a suitable solvent, such as N-methylpyrrolidone (NMP), γ-butyrolactone, or cyclopentanone according to manufacturer's specifications if the polymers are not already supplied in solution form. The solution is formulated for use in forming films, for example by spin or spray coating a silicon substrate or the like, according to standard IC fabrication methods.

The NLO compounds in the solution are present in the polymer in an amount typically between about 5–45 percent by weight, and preferably 10–20 percent by weight of total solids (polymer and dipolar molecules).

After forming the polymer solution into a thin film, the material is cured or partially cured as discussed above. In one general embodiment, the polymer matrix is one which can be cured to a final cured state at a temperature above 200° C., and still provide a $T_g$ above the curing temperature that allows poling of the dipolar molecules, during a relatively brief high-temperature poling step.

In another general embodiment, the polymer matrix becomes highly densified in a final cured state, such that the poling step must take place as part of the final high-temperature curing step. In both embodiments, final curing at temperatures in the range 200° C.–325° C. or higher is desired, to ensure stability of the polymer at these temperatures.

The compounds should show high temperature stability and high sublimation temperature, making them compatible with heating procedures employed in device manufacture. For waveguide use in particular, further desirable properties include low light absorbance at device wavelengths, photobleachability, compatibility with host matrix materials, and availability from commercial sources or via straightforward synthetic techniques.

The dipolar compounds can be modified to contain additional substituents to alter the solubility and physical properties of the compound. For example, solubility can be enhanced and volatility can be reduced. The compounds of the invention can be modified to include substituents compatible with covalent linkage to a macromolecular or polymeric matrix.

According to an important feature of the invention, the compounds of the invention are useful in forming waveguide materials which are stable to the high temperatures typically used in IC fabrication and afford desirable electro-optic properties. The compounds of this invention are dissolved in a polymer matrix or, alternatively, are prepared as an integral part of the polymer matrix. In order for the polymer material to guide modes of optical radiation, the polymer and the material adjacent to it (i.e., a buffer or cladding) must be transparent at the wavelength of the optical radiation, and the cladding must have a lower refractive index than the polymer and must be of sufficient thickness to prevent optical radiation in the polymer material from being significantly affected by any materials beyond the cladding. The modes of optical radiation that are guided by the polymer material in the absence of oriented dipolar molecules in the matrix are confined in only one dimension, namely the dimension perpendicular to the plane of the material. The guided modes are not confined in either lateral dimension.

Figure 1:
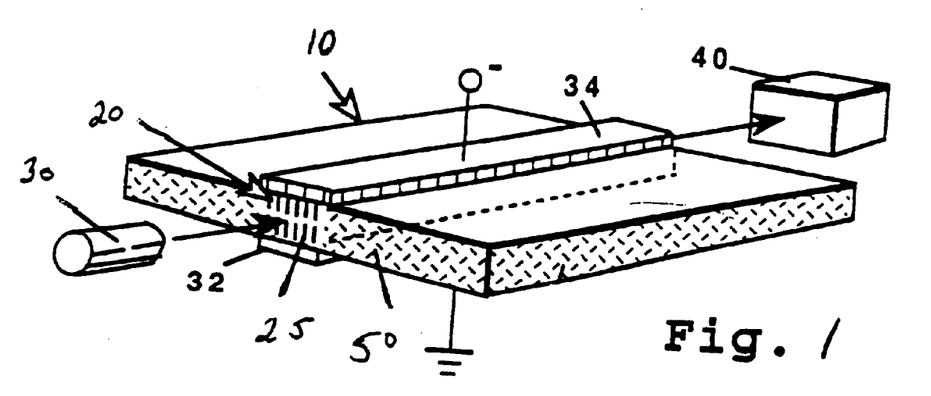
FIG. 1 represents a waveguide using the composition in accordance with the present invention.

In the embodiment shown in FIG. 1, the waveguide channel 20 of device 10, is formed by the region of oriented dipolar compounds 25, and the lateral cladding by adjacent non-channel regions of the material in which the dipolar molecules are randomly oriented. In addition, the dipole molecules in non-channel regions of the material can be photobleached, to further reduce the index of refraction of the non-channel regions. Portions of the waveguide channel may contain passive waveguide regions of non-oriented dipolar molecules, and switching regions of oriented dipolar molecules, where non-channel regions of the material contain photobleached molecules or polymer lacking dipolar molecules.

More generally, the electrooptical (EO) device 10 contains a waveguide channel 20 having at least regions in which the dipolar molecules have a dominant orientation, preferably with the net dipole moments oriented normal to the plane of the material, similar to FIG. 6B in U.S. Pat. No. 5,414,791. Considering the operation of the EO material, it is assumed that the section of EO material shown in FIG. 1 corresponds to a switch region in the layer of an EO device. That is, the waveguide channel 20 shown in the figure is part of an elongate channel which includes channel regions both upstream of the switch region, which receives light signals from a laser source 30, and downstream of the switch region, where the light signals are processed by a photosensing device 40.

The poled channel portion has a greater index of refraction than does the adjacent non-channel portions 50 for at least one polarization of the optical radiation. A beam of optical radiation from a source is thereby confined within the lateral dimension of the channel which therefore, in combination with the lateral non-channel regions, and upper and lower cladding (not shown) functions as an optical waveguide. The phase of a beam of optical radiation propagated through channel 20 can be modulated by placing switching electrodes across the channel section. The switching electrodes, here electrodes 32, 34, are spaced apart from the channel waveguide by cladding portions of the polymer material, or by cladding layers formed over the waveguide channel, as described below.

Because of the linear EO effect, the application of a modulating electric field across the channel by the switching electrodes changes the refractive index of the channel in the region where the field is applied. Little or no reorientation of the dipolar compounds is produced by the modulating electric field, since the host polymer of waveguide material is quite immobilized and in any case the electric field applied during operation of an EO device is much smaller than that used in poling the dipolar molecules.

The increase in the refractive index of the waveguide channel imparts a phase shift to the beam of optical radiation propagating through the switching region. The phase shift may be used to produce a desired EO switching effect in an EO device of the general type described below.

Electro-optical Devices

Three-dimensional waveguides, both active (electro-optic) and passive, which confine guided modes of optical radiation in two dimensions are essential components of integrated electro-optic devices. By partially orienting, or "poling", the optically active dipolar moieties in a selected region or regions of a polymer material layer, a network of three-dimensional electro-optic (EO) waveguides can be formed in the polymer layer in a single process.

Figure 2A:
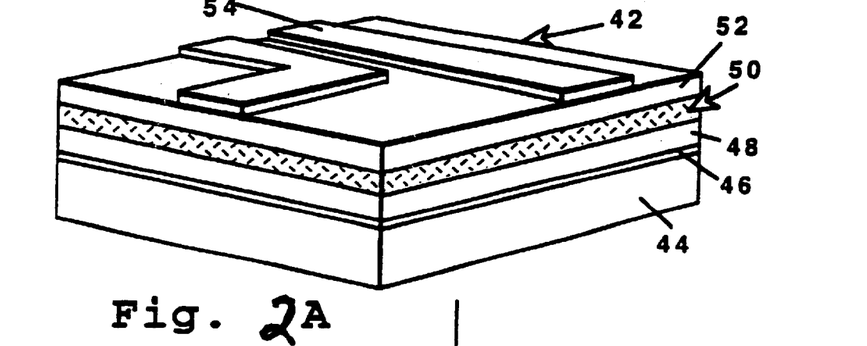
FIGS. 2A–2C illustrate the steps in preparing a device using the NLO materials in accordance with the present invention.
Figure 2B:
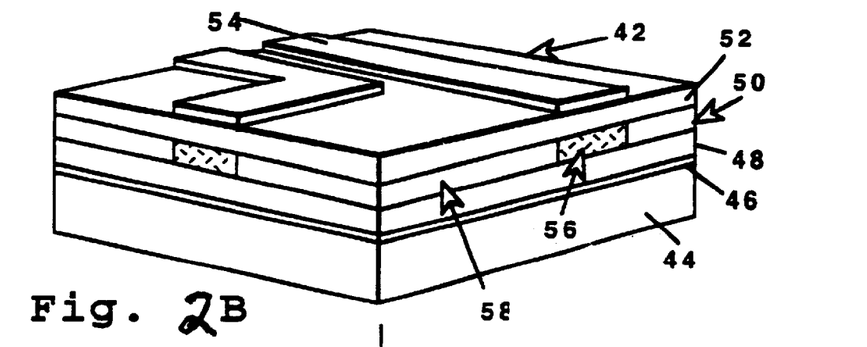
Figure 2C:
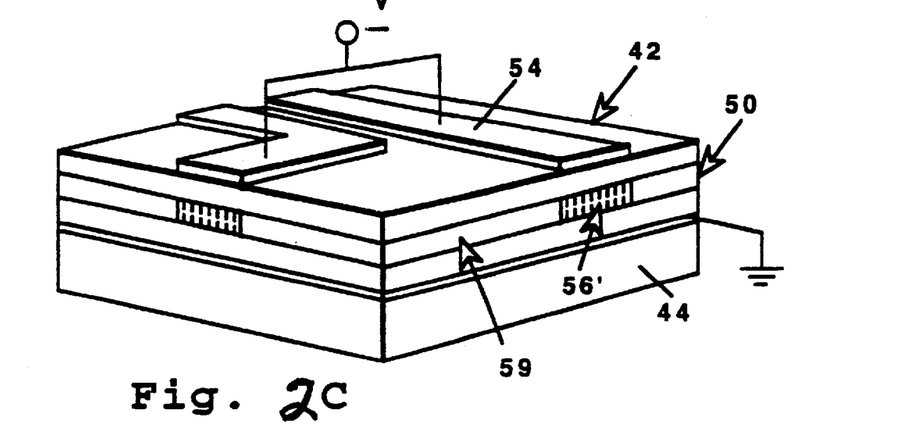

One method for fabricating an electro-optic device in accordance with the present invention is shown in FIGS. 2A–2C which follows the procedure depicted in FIGS. 7A–7C of U.S. Pat. No. 5,414,791 incorporated herein by reference, buts uses the NLO material described above. FIG. 2A shows a section of a waveguide block 42 for use in forming a waveguide in an EO device, in accordance with the invention. The waveguide is fabricated by forming on a suitable substrate 44, such as a silicon substrate, an electrode filn 46, and successive layers which include a lower cladding layer 48, a core EO layer 50, and an upper cladding layer 52. The polymer material forming the core layer has the polymer and the composition described above. The two cladding layers 48, 52 are composed of a polycarbonate or polyacrylate or other heat-stable polymer of the type described above, preferably similar or the same polymer used in the core layer.

The polymer and electrode layers are deposited using conventional IC manufacturing equipment. After each polymer layer is deposited, the new layer is cured, at least partially, as described above. A final electrode configuration, including electrode 54 is formed on the upper layer of the block, and corresponds to the shape and dimensions of the desired waveguide channel.

To form the waveguide channel(s), the block is photobleached using the electrodes as a photomask. Photobleaching may be carried with a conventional UV light source, such as a mercury lamp, at a total exposure of between 100–500 J/cm$^2$. As indicated in FIG. 2B, the photobleaching is effective to form waveguide channel regions, such as region 56 containing unbleached molecules, and non-channel regions, such as region 58, containing bleached molecules which now serve as lateral cladding for the channels. The photobleaching may alternatively be carried out prior to forming the upper electrodes, using an IC photomask. In the final step, FIG. 2C the block is poled, to align the dipole moments in the waveguide channels as indicated. The poled channels, such as channel 56', are EO channels which may be employed as passive waveguide channels or active EO switching elements in the EO device.

Although methods for preparing the waveguide material are illustrated above with respect to an embodiment in which the guest molecules are dissolved in the polymer matrix, it will be understood that the discussion applies to guest molecules covalently incorporated in the polymer matrix as well. For example, the covalent attachment of thiophene containing NLO materials to polycarbonate where, x is between 0 and 500, y is between 0 and 500, and n is between 1 and 1000, thiophene containing NLO's to polyquinolines as follows:

where R is —CH$_n$ CH$_3$, and n is between 0 and 6.

What is claimed is:

1. A non-linear optical device comprising a NLO composition which comprises a chromophore compound of formula (I):

where ED is an electron donating moiety, B is an unsaturated bridging moiety, and EW is the electron withdrawing moiety of the formula (II):

wherein each of A$_1$, A$_2$, A$_3$ and A$_4$ is independently C$_{1-6}$ alkyl, C$_{3-7}$ cycloalkyl, aryl, —CN, —COR, —COOR, —COOH or —CH=C(R)$_2$, wherein R is a C$_{1-4}$ alkyl group, with the proviso that at least one of A$_1$, A$_2$, A$_3$ or A$_4$ is an electron withdrawing group when one or more A$_1$, A$_2$, A$_3$ or A$_4$ are a C$_{1-8}$ alkyl, a C$_{3-7}$, cycloalkyl, or an aryl group.

2. A non-linear optical device according to claim 1, wherein the compound has a molecular weight of about 10,000 g/mol or less.

3. A non-linear optical device according to claim 2, wherein the compound is distributed throughout an organic macromolecular medium.

4. A non-linear optical device according to claim 3, wherein the macromolecule medium is a polymer matrix.

5. A non-linear optical device according to claim 4, wherein the polymer matrix is crosslinked.

6. A non-linear optical device according to claim 1, wherein each of A$_1$, through A$_4$ is a —CN group.

7. A non-linear optical device according to claim 1, wherein the unsaturated bridging moiety B comprises at least one aromatic ring moiety of the formula (V):

(V)

wherein
R$_3$ is (i) a moiety of the formula:

wherein Ar$^1$ is aryl which is optionally substituted with a C$_{1-6}$ acyclic or cyclic alkyl group or heteroaryl having 4 to 7 carbon atoms and containing one or more ring heteroatoms selected from the group consisting of N, O or S, wherein heteroaryl is optionally substituted with a C$_{1-6}$ acyclic or cyclic alkyl group, or
(ii) cyclohexene substituted with a C$_{1-6}$ alkyl group.

8. A non-linear optical device according to claim 1, wherein the unsaturated bridging moiety B is aryl or heteroaryl having 4 to 7 carbon atoms and containing one or more ring heteroatoms selected from the group consisting of N, O or S, wherein the aryl or heteroaryl group is optionally substituted with a C$_{-6}$ acyclic or cyclic alkyl group.

9. A non-linear optical device according to claim 1, wherein the bridging moiety B comprises an arylalkyl moiety, a pyrrolyl moiety, a furanyl moiety or a thiophenyl moiety.

10. A non-linear optical device according to claim 7, wherein the unsaturated bridging moiety B comprises a substituted cyclohexenyl moiety.

11. A non-linear optical device according to claim 1, wherein the electron donor ED moiety comprises an amino group of the formula —NR$_1$R$_2$, wherein R$_1$ is methyl, ethyl, propyl, iso-propyl, butyl, iso-butyl, pentyl, iso-pentyl, hexyl, or iso-hexyl, and R$_2$ is hydroxymethyl, hydroxyethyl, hydroxypropyl, hydroxybutyl, hydroxypentyl or hydroxyhexyl.

12. A non-linear optical device according to claim 1, wherein the electron donor moiety comprises a tertiary amine.

13. A non-linear optical device according to claim 1, wherein A$_1$, A$_2$, A$_3$ and A$_4$ groups are the same; and wherein the bridging moiety B is an aromatic moiety of the formula (V):

(V)

wherein
R$_3$ is (i) a moiety of the formula:

wherein Ar$^1$ is aryl which is optionally substituted with a C$_{1-6}$ acyclic or cyclic alkyl group or heteroaryl having 4 to 7 carbon atoms and containing one or more ring heteroatoms selected from the group consisting of N, O, or S, wherein heteroaryl is optionally substituted with a C$_{1-6}$ acyclic or cyclic alkyl group, or
(ii) cyclohexene substituted with a C$_{1-6}$ alkyl group; and the electron donating moiety comprises an amino moiety of the formula —NR$_1$R$_2$ wherein each of R$_1$ and R$_2$ is independently methyl, ethyl, propyl, iso-propyl, butyl, iso-butyl, pentyl, iso-pentyl, hexyl, iso-hexyl, hydroxymethyl, hydroxyethyl, hydroxypropyl, hydroxybutyl, hydroxypentyl or hydroxyhexyl.

14. A non-linear optical device according to claim 1, wherein A$_1$, A$_2$, A$_3$ and A$_4$ are —CN; wherein the bridging moiety comprises an aryl moiety or a heteroaryl moiety selected from the group consisting of pyrrolyl, furanyl and thiophenyl; and wherein the electron donating moiety is an amine.

15. A non-linear optical device according to claim 14, wherein the compound is a macromolecule.

16. A non-linear optical device according to claim 1, wherein the composition is prepared by one or more steps so that it is a second order nonlinear optical composition.

17. A non-linear optical device according to claim 16, wherein said one or more steps include a poling step.

18. A non-linear optical device according to claim 15, wherein the composition has a glass transition temperature, measured by dielectric spectroscopy, of at least about 200° C.

19. A non-linear optical device according to claim 4, wherein the macromolecule is polycarbonate, polyquinoline or polyimide.

20. A non-linear optical optical device according to claim 1, wherein the compound is of the formula:

wherein each of R$_1$, or R$_2$ is independently methyl, ethyl, propyl, iso-propyl, butyl, iso-butyl, pentyl, iso-pentyl, hexyl, iso-hexyl, hydroxymethyl, hydroxyethyl, hydroxypropyl, hydroxybutyl, hydroxypentyl or hydroxyhexyl.

21. A non-linear optical device according to claim 1, wherein the compound-is defined by the following formula:

wherein each of R$_1$, or R$_2$ is independently methyl, ethyl, propyl, iso-propyl, butyl, iso-butyl, pentyl, iso-pentyl, hexyl, iso-hexyl, hydroxymethyl, hydroxyethyl, hydroxypropyl, hydroxybutyl, hydroxypentyl or hydroxyhexyl.

22. An electro-optical waveguide comprising≈ a macromolecular matrix having a chromophore compound distributed therethrough, the chromophore compound having a dipole moment and is of the formula:

$$ED\text{—}B\text{—}EW \quad (I)$$

wherein ED is an electron donating moiety, B is a bridging moiety, and EW is a terminal acceptor moiety of the formula II:

(II)

wherein each of $A_1$, $A_2$, $A_3$ and $A_4$ is independently an electron withdrawing moiety selected from the group consisting of —CN, —COR, —COOR, —COOH and —CH=C(R)$_2$, wherein R is a $C_{1-6}$ alkyl group.

23. The waveguide according to claim 22, wherein the matrix is a second order NLO material, and the chromophore compound is of the formula:

wherein
  each of $R_1$, and $R_2$ is independently $C_{1-6}$ alkyl selected from the group consisting of methyl, ethyl, propyl, iso-propyl, butyl, iso-butyl, pentyl, iso-pentyl, hexyl, and iso-hexyl, or $C_{1-6}$ alkanol selected from the group consisting of hydroxymethyl, hydroxyethyl, hydroxypropyl, hydroxybutyl, hydroxypentyl and hydroxyhexyl;
  B is an aromatic bridging moiety of the formula (V):

(V)

wherein
  $R_3$ is (i) a moiety of the formula:

wherein $Ar^1$ is aryl which is optionally substituted with a $C_{1-6}$ acyclic or cyclic alkyl group or heteroaryl having 4 to 7 carbon atoms and containing one or more ring heteroatoms selected from the group consisting of N, O or S, and wherein heteroaryl is optionally substituted with a $C_{1-6}$ acyclic or cyclic alkyl group, or (ii) cyclohexene substituted with a $C_{1-6}$ alkyl group; and $A_1$, $A_2$, $A_3$ and $A_4$ are as defined in claim 22.

24. The waveguide according to claim 22, wherein the chromophore compound is covalently bonded to the matrix.

25. The waveguide according to claim 22, wherein the chromophore compound is not covalently bonded to the matrix.

26. The waveguide according to claim 22, wherein the matrix has a glass transition temperature, measured by dielectric spectroscopy, of at least 200° C.

27. The waveguide according to claim 22, wherein the matrix has a glass transition temperature, measured by dielectric spectroscopy, of at least 100° C.

28. The waveguide according to claim 22, wherein the matrix has a glass transition temperature, measured by dielectric spectroscopy, of at least 150° C.

29. The waveguide according to claim 22, wherein the matrix has a glass transition temperature, measured by dielectric spectroscopy, of at least 250° C.

30. The waveguide according to claim 22, wherein the matrix has a glass transition temperature, measured by dielectric spectroscopy, of at least 300° C.

31. A non-linear optical device comprising:
  (A) at least one waveguide comprising a macromolecular matrix and a chromophore compound optionally covalently bonded to the macromolecular matrix, wherein the chromophore compound comprises at least one electron accepting moiety of the formula (II):

(II)

wherein each of $A_1$, $A_2$, $A_3$ and $A_4$ is independently an electron withdrawing group;
    the chromophore compound having a net dipole moment,
    the waveguide having at least one region in which the net dipole moments of the chromophore compound are oriented directionally such that the index of refraction of the region can be modulated by applying an electric field; and
  (B) at least two electrodes positioned for use in modulating the index of refraction of the region.

32. The device according to claim 31 wherein the matrix is a second order NLO material, and the chromophore compound is of the formula:

wherein
  each of $R_1$ and $R_2$ is independently $C_{1-6}$ alkyl selected from the group consisting of methyl, ethyl, propyl, iso-propyl, butyl, iso-butyl, pentyl, iso-pentyl, hexyl, iso-hexyl, or $C_{1-6}$ alkanol selected from the group consisting of hydroxymethyl, hydroxyethyl, hydroxypropyl, hydroxybutyl, hydroxypentyl and hydroxyhexyl;

B is an aromatic bridging moiety of the formula (V):

(V)

wherein
$R_3$ is
(i) a moiety of the formula:

wherein $Ar^1$ is aryl which is optionally substituted with a $C_{1-6}$ acyclic or cyclic alkyl group or heteroaryl having 4 to 7 carbon atoms and containing one or more ring heteroatoms selected from the group consisting of N, O or S, and wherein heteroaryl is optionally substituted with a $C_{1-6}$ acyclic or cyclic alkyl group, or
(ii) cyclohexene substituted with a $C_{1-6}$ alkyl group; and each of $A_1$, $A_2$, $A_3$ and $A_4$ is independently —CN, —COR, —COOR, —COOH or —CH=C(R)$_2$, wherein R is a $C_{1-6}$ alkyl.

33. A device according to claim 31, wherein the chromophore compound is covalently bonded to the macromolecular matrix.

34. A device according to claim 31, wherein the chromophore compound is not covalently bonded to the macromolecular matrix.

35. A method for preparing a chromophore compound of the formula:

said method comprising reacting an electron donating amine substituted aromatic bridging compound of the formula:

with a terminal acceptor compound of the formula:

in the presence of an ethanolic acetic acid solution to produce the chromophore compound, wherein each of $R_1$ and $R_2$ is independently methyl, ethyl, propyl, iso-propyl, butyl, iso-butyl, pentyl, iso-pentyl, hexyl, iso-hexyl hydroxymethyl, hydroxyethyl, hydroxypropyl, hydroxybutyl, hydroxypentyl, or hydroxyhexyl;

B is an aromatic bridging moiety of the formula (V):

(V)

wherein
$R_3$ is (i) a moiety of the formula:

wherein $Ar^1$ is aryl which is optionally substituted with a $C_{1-6}$ acyclic or cyclic alkyl group or heteroaryl having 4 to 7 carbon atoms and containing one or more ring heteroatoms selected from the group consisting of N, O or S, and wherein heteroaryl is optionally substituted with a $C_{1-6}$ acyclic or cyclic alkyl group, or
(ii) cyclohexene substituted with a $C_{1-6}$ alkyl group;

each of $A_1$, $A_2$, $A_3$ and $A_4$ is independently an electron withdrawing group selected from the group consisting of —CN, —COR, —COOR, —COOH or —CH=C(R)$_2$, where R is a $C_{1-6}$ alkyl group; and B' is an aldehyde moiety of the formula:

wherein $R_3$ is as defined above.

* * * * *

UNITED STATES PATENT AND TRADEMARK OFFICE
CERTIFICATE OF CORRECTION

PATENT NO. : 6,623,665 B1
DATED : September 23, 2003
INVENTOR(S) : Susan P. Ermer It is certified that error appears in the above-identified patent and that said Letters Patent is hereby corrected as shown below:

Column 13,
Line 30, "$C_{-6}$" should read -- $C_{1-6}$ --.

Column 14,
Line 33, the second occurrence of "optical" should be deleted.
Line 53, "compound-is" should read -- compound is --.

Column 15,
Line 3, "comprising $\approx$ a" should read -- comprising a --.

Signed and Sealed this

Eleventh Day of January, 2005

JON W. DUDAS
*Director of the United States Patent and Trademark Office*